J. WAGNER.
Sausage Stuffer.
No. 23,416.
Patented March 29, 1859.
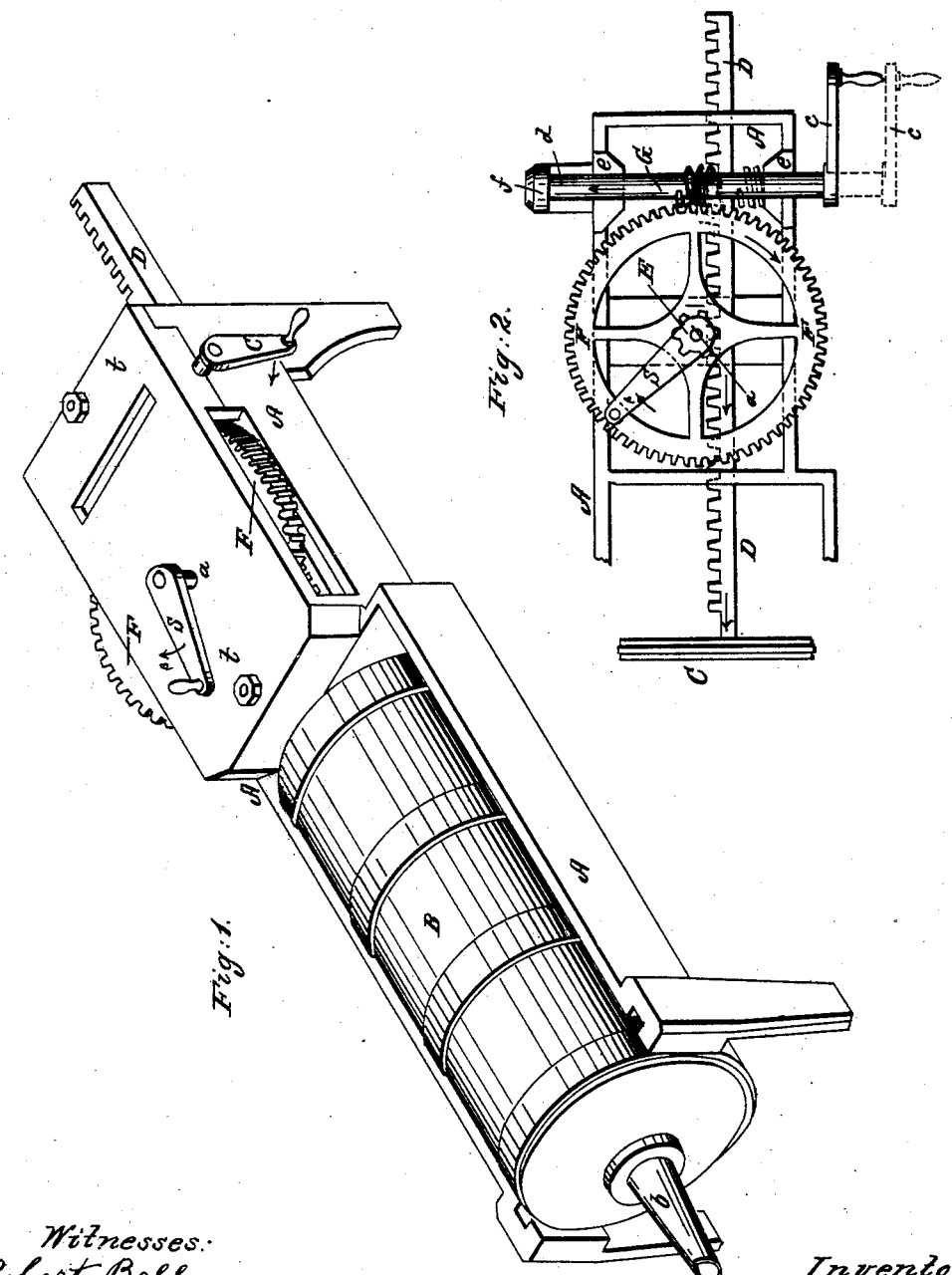
Witnesses:
Robert Bell
Henry Mower
Inventor:
John Wagner

UNITED STATES PATENT OFFICE.

JOHN WAGNER, OF PITTSBURG, PENNSYLVANIA.

SAUSAGE-STUFFER.

Specification of Letters Patent No. 23,416, dated March 29, 1859.

*To all whom it may concern:*

Be it known that I, JOHN WAGNER, of Pittsburg, in the county of Allegheny and State of Pennsylvania, have invented a new and useful Improvement in Machines for Stuffing Sausages; and I hereby declare that the following is a full, clear, and exact description of the construction and operation of the same.

The machine, to which my improvement has reference, is of that well known class of sausage stuffers, in which the sausage meat is placed into a cylinder or box, and forced out of the same into the gut by means of a piston, moving in the said cylinder or box. And the nature of my improvement consists in a certain arrangement of the gear (for operating the piston), made in such a manner, that by means thereof the piston is forced forward with the proper slow motion, and after having accomplished its forward stroke, is drawn back again in a speedy manner.

In order to set forth my improvement more fully, I proceed to describe the accompanying drawings, which make a part of this specification, and in which—

Figure 1 is a perspective view of the whole machine and Fig. 2 a top view of its wheel gear.

In these figures the same letters of reference are marked on alike parts.

A A is the framework;—B the cylinder, laid into the framework, so as to be held thereby firmly in its position.

$b$ is a spout at the end of the cylinder.

C (Fig. 2) is the piston, fitting tightly into the cylinder.

D is a rack rod to which the piston is attached.

E is a pinion, gearing into the rack rod. F a screw wheel and G an "endless" screw, or "worm," gearing into the wheel F.

The pinion E and screw wheel F are on the vertical spindle $d$, the upper end of which passes through the top plate $t$ of the framework, and is provided with the crank $s$; there is also a crank $c$ at the outer end of the screw spindle G.

The screw spindle rests in the bearings $e, e'$, and its butt end $d$, bears against the block $f$, when the "worm" is in gear with the screw wheel.

The operation of the machine is as follows: In turning the crank $c$ in the direction as indicated by arrow in Fig. 1, the piston C is forced forward with a slow motion, but great power, by the intermedium of the "worm" G, wheel F, pinion E and rack rod D. The respective motions of all these parts are indicated by arrows in Fig. 2. The sausage meat (which previously has been placed into the cylinder) is hereby forced out through the spout $b$ into the gut in the ordinary manner viz: by stripping the gut over the said spout. During this operation, the screw spindle G is subjected to a side pressure, acting in the direction as indicated by arrow $a$, and produced by the resistance, offered by the cogs of the wheel F to the incline of the screw threads. This side pressure on the screw is resisted by the butt end ($d$) of the spindle bearing against the block $f$ of the frame the butt end being rounded off, for the purpose of reducing the friction at this place to a minimum. When the piston has arrived at the end of its forward stroke, it has to be drawn back again. For this purpose, I first give to the operating crank $c$ a few reversed turns, whereby the thread of the "worm" (being in contact with the teeth of the wheel F,) will cause the screw spindle G to slide sidewise into the position, as indicated by dotted lines in Fig. 2. After the "worm" has thus got out of gear with the wheel F, I then turn the crank $s$, on top of the spindle, $a$, in the direction as indicated by arrow $\beta$ in Figs. 1 and 2, whereby the piston is drawn back simply by the intermedium of the pinion E and rack rod D; only a few turns of the crank $s$ being sufficient to accomplish that purpose. The described arrangement thus enables me, of imparting to the piston the proper speed for its two motions, viz: a slow forward motion and a quick return motion, in an extremely simple and convenient manner.

Having thus fully described my improved sausage-stuffer, I wish it distinctly understood, that I do not claim the "endless screw" or "worm and wheel", this being a well known mechanical device, though the same has, to my knowledge, not been used before in sausage stuffers; nor do I claim any other part of wheel gear arrangement, when considered by itself. But

What I do claim as new, and desire to secure by Letters Patent, is:

The arrangement of using in addition to the operating crank $c$ for the forward motion, another operating crank $s$, or its equivalent, for the backward motion, when applied to the wheel gear arrangement of a "worm and wheel" in the manner as herein described, viz: when set on the spindle $a$ of the screw wheel F, substantially as and for the purpose herein set forth.

JOHN WAGNER.

Witnesses:
ROBERT BELL,
HENRY MOESER.